United States Patent
Hotta et al.

(10) Patent No.: US 8,930,369 B2
(45) Date of Patent: Jan. 6, 2015

(54) INFORMATION PROCESSING APPARATUS, MESSAGE CLASSIFYING METHOD AND NON-TRANSITORY MEDIUM FOR ASSOCIATING SERIES OF TRANSACTIONS

(75) Inventors: Yuuji Hotta, Kawasaki (JP); Motoyuki Kawaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 227 days.

(21) Appl. No.: 13/355,675

(22) Filed: Jan. 23, 2012

(65) Prior Publication Data

US 2012/0239656 A1    Sep. 20, 2012

(30) Foreign Application Priority Data

Mar. 14, 2011    (JP) .................................. 2011-055967

(51) Int. Cl.
   *G06F 17/30*    (2006.01)
   *G06F 11/34*    (2006.01)

(52) U.S. Cl.
   CPC ........ *G06F 11/3495* (2013.01); *G06F 11/3476* (2013.01); *G06F 11/3419* (2013.01); *G06F 2201/865* (2013.01); *G06F 2201/87* (2013.01); *G06F 2201/875* (2013.01)
   USPC .......................................... 707/740; 707/603

(58) Field of Classification Search
   CPC .......... G06F 17/30264; G06F 11/3419; G06F 11/3476; G06F 11/3495; G06F 2201/865; G06F 2201/87; G06F 2201/875; G06Q 10/06; G06Q 10/087; G06Q 10/10; G06Q 10/20; G06Q 20/10; G06Q 30/0222; G06Q 30/0283; G06Q 30/04
   USPC .................. 707/603, 740, E17.089; 709/224; 713/201; 705/35, 14.23, 26.1, 28, 30, 705/305, 31, 32, 34, 37, 39, 400
   See application file for complete search history.

(56) References Cited

U.S. PATENT DOCUMENTS

| | | | |
|---|---|---|---|
| 6,823,382 B2 * | 11/2004 | Stone | ............................ 709/224 |
| 7,805,509 B2 | 9/2010 | Alon et al. | |
| 8,305,908 B2 | 11/2012 | Yokoyama | |
| 2002/0078382 A1 * | 6/2002 | Sheikh et al. | ................. 713/201 |
| 2003/0036886 A1 | 2/2003 | Stone | |
| 2010/0017401 A1 | 1/2010 | Higuchi et al. | |
| 2010/0153571 A1 | 6/2010 | Shimizu et al. | |
| 2012/0317072 A1 | 12/2012 | Harada et al. | |

FOREIGN PATENT DOCUMENTS

| | | | | |
|---|---|---|---|---|
| EP | 2 447 702 A2 * | 5/2012 | ............. | G01N 35/02 |
| JP | 2006-11683 | 1/2006 | | |
| JP | 2008-502044 A | 1/2008 | | |

(Continued)

OTHER PUBLICATIONS

JPOA—Office Action of Japanese Patent Application No. 2011-55967 mailed Jul. 1, 2014, with full English-language translation of the Office Action.

*Primary Examiner* — Shahid Alam

(74) *Attorney, Agent, or Firm* — Fujitsu Patent Center

(57) ABSTRACT

A tied server includes a first storage unit that stores appearance patterns of messages having a transaction identifier to identify a transaction. The tied server also includes a second storage unit that stores messages executed on the transaction DB server having the transaction ID by the application server and communicated between an application server and a DB server. The tied server classifies the messages stored in the second storage unit with respect to each transaction based on the appearance patterns of the messages stored in the first storage unit.

6 Claims, 12 Drawing Sheets

(56) References Cited

FOREIGN PATENT DOCUMENTS

| | | |
|---|---|---|
| JP | 2009-277119 A | 11/2009 |
| JP | 2010-044742 A | 2/2010 |
| JP | 2010-146146 A | 7/2010 |
| JP | 2010-218185 | 9/2010 |
| WO | WO-2005/119611 | 12/2005 |

\* cited by examiner

| CLASS NAME | METHOD NAME | TranID |
|---|---|---|
| org.hibernate.foo | createQuery | tid-123 |
| ... | ... | ... |

FIG.4

| CLASS NAME | METHOD NAME |
|---|---|
| java.foo.ClassA | * |
| org.hibernate.* | * |
| myApp.* | * |
| ... | ... |

FIG.5

| CLASS NAME | METHOD NAME |
|---|---|
| org.hibernate.foo | createQuery |
| ... | ... |

FIG.7

| timestamp | App-key | START/END | TranID | CLASS NAME | METHOD NAME | NEXT MESSAGE | PREVIOUS MESSAGE |
|---|---|---|---|---|---|---|---|
| 12:33:02 | 123 | START | tid-123 | org.hibernate.foo | createQuery | 124 | - |
| 12:37:04 | 124 | END | tid-123 | org.hibernate.foo | createQuery | 125 | 123 |
| ... | ... | ... | ... | ... | ... | ... | ... |

FIG.8

| timestamp | DB-key | CONNECTION KEY | fromIP | fromPort | toIP | toPort | sqlmsg | TranID | NEXT MESSAGE | PREVIOUS MESSAGE |
|---|---|---|---|---|---|---|---|---|---|---|
| 12:33:03 | 132 | 38 | A | 59000 | B | 3306 | select... | tid-123 | 133 | 131 |
| 12:33:04 | 133 | 38 | B | 3306 | C | 59000 | - | - | 134 | 132 |
| ... | ... | ... | ... | ... | ... | ... | ... | ... | ... | ... |

FIG.9

| KEY | TranID | LAST UPDATE TIME | START MESSAGE | END MESSAGE | NEXT TIME-ORDERED RECORD | PREVIOUS TIME-ORDERED RECORD |
|---|---|---|---|---|---|---|
| 15 | tid-123 | 12:34:05 | 123 | 127 | 18 | 14 |
| 18 | tid-127 | 12:35:06 | 185 | 201 | 22 | 15 |
| ... | ... | ... | ... | ... | ... | ... |

FIG.10

| CONNECTION KEY | LAST UPDATE TIME | START MESSAGE | END MESSAGE | START TranID INFORMATION | END TranID INFORMATION |
|---|---|---|---|---|---|
| 38 | 12:34:06 | 132 | 144 | 512 | 517 |
| 40 | 12:35:09 | 137 | 152 | 514 | 523 |
| ... | ... | ... | ... | ... | ... |

FIG.11

| TranID INFORMATION | TranID | MESSAGE | NEXT TranID INFORMATION | DB CLASSIFICATION TABLE INFORMATION |
|---|---|---|---|---|
| 512 | tid-123 | 133 | 513 | 38 |
| ... | ... | ... | ... | ... |

FIG.12

| TYPE | NUMBER OF PREVIOUS MESSAGES | NUMBER OF ALL MESSAGES | RELIABILITY |
|---|---|---|---|
| create | 1 | 4 | 1 |
| ... | ... | ... | ... |

FIG.13

| TranID | TYPE | CONNECTION KEY | NUMBER OF MESSAGES | START MESSAGE | END MESSAGE | PROCESSING TIME | RESULT |
|---|---|---|---|---|---|---|---|
| tid-123 | Create | 38 | 4 | 132 | 134 | 2s | NORMAL |
| tid-127 | Delete | 40 | 5 | 134 | 138 | 5s | ABNORMAL |
| ... | ... | ... | ... | ... | ... | ... | ... | ially by means of the elements and combina-
INFORMATION PROCESSING APPARATUS, MESSAGE CLASSIFYING METHOD AND NON-TRANSITORY MEDIUM FOR ASSOCIATING SERIES OF TRANSACTIONS

CROSS-REFERENCE TO RELATED APPLICATION

This application is based upon and claims the benefit of priority of the prior Japanese Patent Application No. 2011-055967, filed on Mar. 14, 2011, the entire contents of which are incorporated herein by reference.

FIELD

The embodiments discussed herein are directed to an information processing apparatus, a message isolation method, and a message isolation program.

BACKGROUND

In an operation management of Web applications providing services to users via the Internet, performance measurements of Web applications have been made to monitor for delay of processing requests from users.

For performance measurements, it is effective to detect a processing request from a user from a series of message groups and to monitor HTTP (HyperText Transfer Protocol) request processing and DB (Data Base) access processing from the first request to a response to the user. That is, it is effective to detect each transaction executed by the Web application.

Profiling and network monitoring are generally used as such methods of measuring performance of Web applications. For example, profiling monitors execution conditions of each piece of processing executed inside an application running on a server to be profiled. Network monitoring monitors communication between a target server and an external server by capturing packets transmitted/received by the target server.

Generation of a transaction ID to identify a transaction is triggered by the start of the transaction. Then, the transaction is identified by using the generated transaction ID and also a processing sequence between servers linking and executing one transaction is generated.

Patent Document 1: Japanese Laid-open Patent Publication No. 2009-277119
Patent Document 2: Japanese Laid-open Patent Publication No. 2010-146146
Patent Document 3: Japanese National Publication of International Patent Application No. 2008-502044
Patent Document 4: Japanese Laid-open Patent Publication No. 2010-044742

Unfortunately, however, a series of transactions may not be associated by conventional technology.

For example, profiling can monitor processing inside an application, but may not monitor communication information with an external device. Network monitoring can monitor communication with an external device, but may not monitor processing inside an application. That is, whole transactions may not be monitored by these technologies and thus, transactions executed by an application server or database server may not be associated. Incidentally, also a technology using the transaction ID simply determines the sequence of servers on which each transaction is executed and may not monitor transactions executed by a database server.

To cite an example, when a Web application transmits a request to a DB driver, the request to one DB driver may be transmitted as a plurality of requests to a DB server so that they are received as a plurality of responses. In this case, according to conventional technology, no information to associate communication between the DB driver and the server with a transaction is available and thus, the communication and the transaction may not be associated.

SUMMARY

According to an aspect of an embodiment of the invention, an information processing apparatus includes a first storage unit that stores appearance patterns of messages having a transaction identifier to identify a transaction; a second storage unit that stores messages communicated between a first server and a second server after the transaction having the transaction identifier, being executed on the second server by the first server; and a classification unit that classifies the messages stored in the second storage unit with respect to each transaction based on the appearance patterns of the messages stored in the first storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating an example of information stored in a logging target table;
FIG. 5 is a diagram illustrating an example of information stored in a DB instruction replacement target table;
FIG. 7 is a diagram illustrating an example of information stored in an application log table;
FIG. 8 is a diagram illustrating an example of information stored in a DB capture table;
FIG. 9 is a diagram illustrating an example of information stored in an application method classification table;
FIG. 10 is a diagram illustrating an example of information stored in a DB classification table;
FIG. 11 is a diagram illustrating an example of information stored in a transaction ID table;
FIG. 12 is a diagram illustrating an example of information stored in a learning table;
FIG. 13 is a diagram illustrating an example of information stored in a message classification table.

DESCRIPTION OF EMBODIMENTS

Preferred embodiments of the present invention will be explained with reference to accompanying drawings. The present invention is not limited by these embodiments.

[a] First Embodiment

Figure 1:
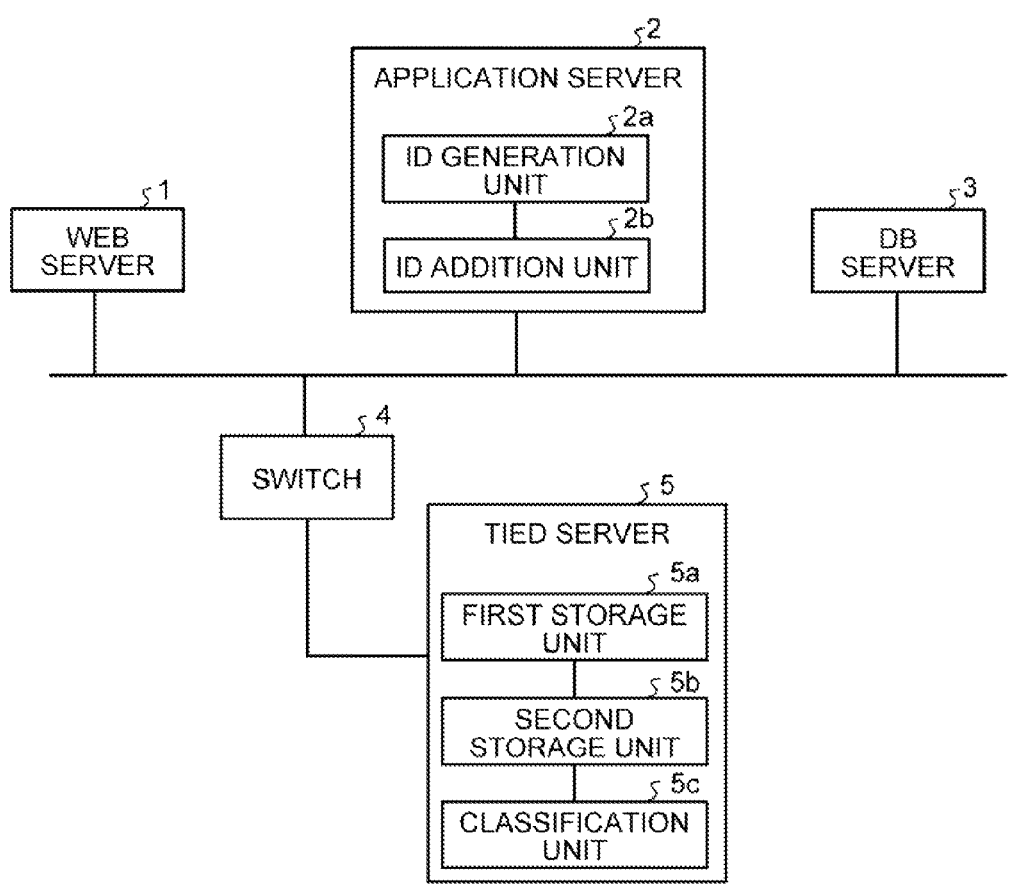
FIG. 1 is a diagram illustrating an overall configuration of a system according to a first embodiment.

FIG. 1 is a diagram illustrating an overall configuration of a system according to the first embodiment. As illustrated in FIG. 1, the system includes a Web server 1, an application server 2, a DB (DataBase) server 3, a switch 4, and a tied server 5. These apparatuses are connected via a network such as a LAN (Local Area Network) and the Internet.

The Web server 1 is a server apparatus that accumulates information such as HTML (HyperText Markup Language) documents and images and responds with an HTML document or an image in return for a request received from a client via a Web browser or the like. The Web server 1 holds execution results of a transaction as a log. For example, the Web server 1 receives a response from an application executed by the application server 2 and returns information in accordance with a request from the Web browser or the like.

The application server 2 is a server apparatus that accepts a request from the client or the Web server 1 and executes an application to execute a transaction with the Web server 1 or the DB server 3 and holds execution results of the application as a log. The application server 2 includes an ID generation unit 2a and an ID addition unit 2b.

The ID generation unit 2a generates a transaction ID (hereinafter, denoted as a TranID) that is a unique identifier for each client requesting execution of an application and identifies a transaction executed by the application. The ID addition unit 2b adds a TranID generated by the ID generation unit 2a to a transaction and executes the transaction. Assume, for example, that the Web server 1 that receives a request from the client executes a transaction inside the Web server 1, a transaction with the application server 2, and a transaction with the DB server 3. Then, the ID generation unit 2a generates a TranID for each transaction. Thereafter, the ID addition unit 2b executes the transactions with the added TranID on the applicable servers.

The DB server 3 is a server apparatus that has a DB to store data and executes data writing or data reading in accordance with a transaction received from the application server 2. The DB server 3 holds execution results of the transaction as a log. The DB held by the DB server 3 may be a relational database, an object database, KVS (key value store) or the like.

The switch 4 holds path information in a network and is a repeater such as an L2 switch (Layer 2 switch) or switching hub that switches communication between servers. For example, the switch 4 relays communication between the tied server 5 and the Web server 1, between the tied server 5 and the application server 2, or between the tied server 5 and the DB server 3. Incidentally, the switch 4 may be a router, L3 switch (Layer 3 switch) or the like.

The tied server 5 is a server apparatus that includes a first storage unit 5a, a second storage unit 5b, and a classification unit 5c and ties transactions executed by each server. The first storage unit 5a stores appearance patterns of messages having transaction identifiers identifying transactions. The second storage unit 5b stores messages executed on the transaction DB server 3 having the TranID by the application server 2 and generated between the application server 2 and the DB server 3. The classification unit 5c classifies messages stored in the second storage unit 5b based on the appearance pattern of messages stored in the first storage unit 5a for each transaction.

Generally, the application server 2 can add a TranID to a transaction on the application server 2, a transaction to the Web server 1, and a transaction of SQL or the like to the DB server 3. Thus, log messages and communication messages created by executing these transactions contain TranIDs. However, the application server 2 may not add a TranID to processing such as establishment of a connection that is not related to a transaction executed by the DB server 3. In such a case, a transaction executed by the application server 2 and a message generated from the DB server 3 cannot be associated.

Thus, the tied server 5 according to the first embodiment learns and stores appearance positions indicating the positions of appearance of messages having a TranID among messages generated with the DB server 3. As a result, the tied server 5 can associate a series of transactions starting with a processing request to an application up to DB access.

[b] Second Embodiment

In the second embodiment, a functional block, the flow of processing, and effects will be described as an example of each apparatus illustrated in FIG. 1. The Web server 1 has a function similar to the function of a common Web server, the DB server 3 has a function similar to the function of a common DB server, and the switch 4 has a function similar to the function of a common switch and thus, a detailed description thereof is omitted.

Configuration of the Application Server

Figures 2, 3:
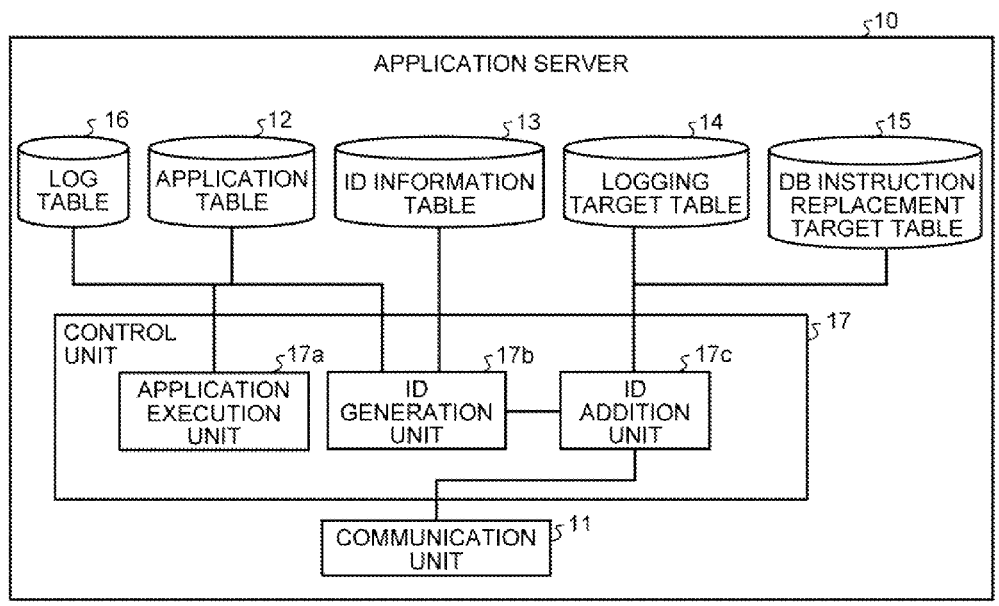
FIG. 2 is a block diagram illustrating the configuration of an application server according to a second embodiment.
FIG. 3 is a diagram illustrating an example of information stored in an ID information table.

FIG. 2 is a block diagram illustrating the configuration of an application server according to the second embodiment. As illustrated in FIG. 2, an application server 10 includes a communication unit 11, an application table 12, an ID information table 13, a logging target table 14, a DB instruction replacement target table 15, a log table 16, and a control unit 17. Each table is provided in a storage apparatus, for example, a semiconductor memory element, a hard disk or the like. Information stored in each table is not limited to information illustrated and can optionally be set and changed.

The communication unit 11 is an interface that controls communication with other apparatuses. For example, the communication unit 11 transmits and receives communication messages between the application server 10 and another server or transmits transactions from the application server 10 to other servers. The communication unit 11 also has a function as a DB driver. For example, the communication unit 11 issues a request by a transaction executed by an application execution unit 17a described later to the DB server 3 and receives a response from the DB server 3.

The application table 12 stores programs of applications executed by the application server 10. For example, the application table 12 stores programs described in Java (registered trademark). The application server 10 provides various services by determining and executing the program from the application table 12 of the application corresponding to a request received from the client.

The ID information table 13 stores a TranID generated by an ID generation unit 17b described later and application information to which the TranID is given. FIG. 3 is a diagram illustrating an example of information stored in the ID information table. As illustrated in FIG. 3, the ID information table 13 stores "org.hibernate.foo, createQuery, tid-123" and the like as the "class name, method name, TranID".

The "class name" stored here is information indicating a class in a program described in Java (registered trademark), the "method name" is information indicating a method in the class determined by the class name, and the "TranID" is a generated transaction ID. The example in FIG. 3 illustrates that "tid-123" is given to "createQuery" in the "org.hibernate.foo" class.

The logging target table 14 stores information about applications to which log messages are to be output. FIG. 4 is a diagram illustrating an example of information stored in the logging target table. As illustrated in FIG. 4, the logging target table 14 stores "java.foo.ClassA, * (*: asterisk)", "org.hibernate.*, *", "myApp.*, *" or the like as the "class name, method name".

The "class name" and the "method name" stored here indicate the same information as in FIG. 3 and thus, a description thereof is omitted. The example in FIG. 4 illustrates that each method in "java.foo.ClassA" is to be logged, each method in the class starting with "org.hibernate" is to be logged, and each method in the class starting with "myApp" is to be logged.

The DB instruction replacement target table 15 stores information indicating whether a DB instruction read by an application is to be replaced. FIG. 5 is a diagram illustrating an example of information stored in the DB instruction replacement target table. As illustrated in FIG. 5, the DB instruction replacement target table 15 stores "org.hibernate.foo, createQuery" or the like as the "class name, method name".

The "class name" and the "method name" stored here indicate the same information as in FIG. 3 and thus, a description thereof is omitted. The example in FIG. 5 illustrates that the "createQuery" in the "org.hibernate.foo" class is to be replaced.

The log table 16 stores logs generated after applications, that is, classes or methods are executed. The log table 16 also stores communication messages generated after applications are executed in each apparatus. That is, the log table 16 stores log messages such as logs and communication messages generated by transactions executed by the application server 10. Information stored in the log table 16 includes, in addition to the above TranID, class name, and method name, processing results indicating information such as the time at which a log is generated, the normal end, and abnormal end.

The control unit 17 includes the application execution unit 17a, the ID generation unit 17b, and an ID addition unit 17c and is a processing unit that executes applications. The control unit 17 is executed by, for example, an electronic circuit such as a CPU (Central Processing Unit) or an integrated circuit such as an ASIC (Application Specific Integrated Circuit).

The application execution unit 17a executes applications in accordance with requests of the client. For example, the application execution unit 17a determines the application corresponding to a request of the client from the application table 12 and executes the application by reading methods in the determined application.

The ID generation unit 17b generates a TranID that is a unique identifier for each client requesting execution of an application and identifies a transaction executed by the application. For example, the ID generation unit 17b hooks a method read from inside a class of the application and references the ID information table 13 to determine whether any ID is given to the method.

Then, if the hooked method is determined to have an ID attached thereto, the ID generation unit 17b directly outputs the method to the ID addition unit 17c. On the other hand, if the hooked method is determined to have no ID attached thereto, the ID generation unit 17b generates a unique TranID for the method. Then, the ID generation unit 17b associates the generated TranID, the class name having the method, and the read method name and to store them in the ID information table 13. The ID generation unit 17b also outputs the hooked method to the ID addition unit 17c.

As another method, the ID generation unit 17b may generate a TranID for each processing thread. The processing thread has a thread ID, which is a unique ID, allocated thereto and is input with a session ID from a Web server. The application server 10 manages association of the thread ID and the session ID.

The ID generation unit 17b holds information about the latest ID for each processing thread. When a new session (transaction) is started, the ID generation unit 17b then updates the latest ID. For example, the session (ID=ses-123) ends and a processing thread (processing thread ID=256) is released. Next, it is assumed that a new session (ID=ses-330) is started and (ID=256) is reused as the processing thread. Then, the ID generation unit 17b updates the latest ID of the processing thread (ID=256). In this case, the ID generation unit 17b generates, for example, uses-330-256-7" or the like as the transaction ID. The transaction ID generated in this manner can directly be referenced from a processing thread that processes a method invocation. For example, the ID generation unit 17b adds the TranID uses-330-256-7" to classes and methods invoked during execution of the session (ses-330) by the processing thread (ID=256).

Returning to FIG. 2, the ID addition unit 17c adds the TranID generated by the ID generation unit 2a to a transaction and executes the transaction. For example, the ID addition unit 17c searches the ID information table 13 by using the name of the method received from the ID generation unit 17b as a key to determine the TranID. Then, the ID addition unit 17c adds the determined TranID to the method received from the ID generation unit 17b and executes the method.

The ID addition unit 17c may add the TranID to only methods to be logged. In this case, if the received method is a method registered with the logging target table 14, the ID addition unit 17c adds a TranID. If the received method is stored in the DB instruction replacement target table 15, the ID addition unit 17c may embed the TranID in a comment in the method or the like.

Configuration of the Tied Server

Figure 6:
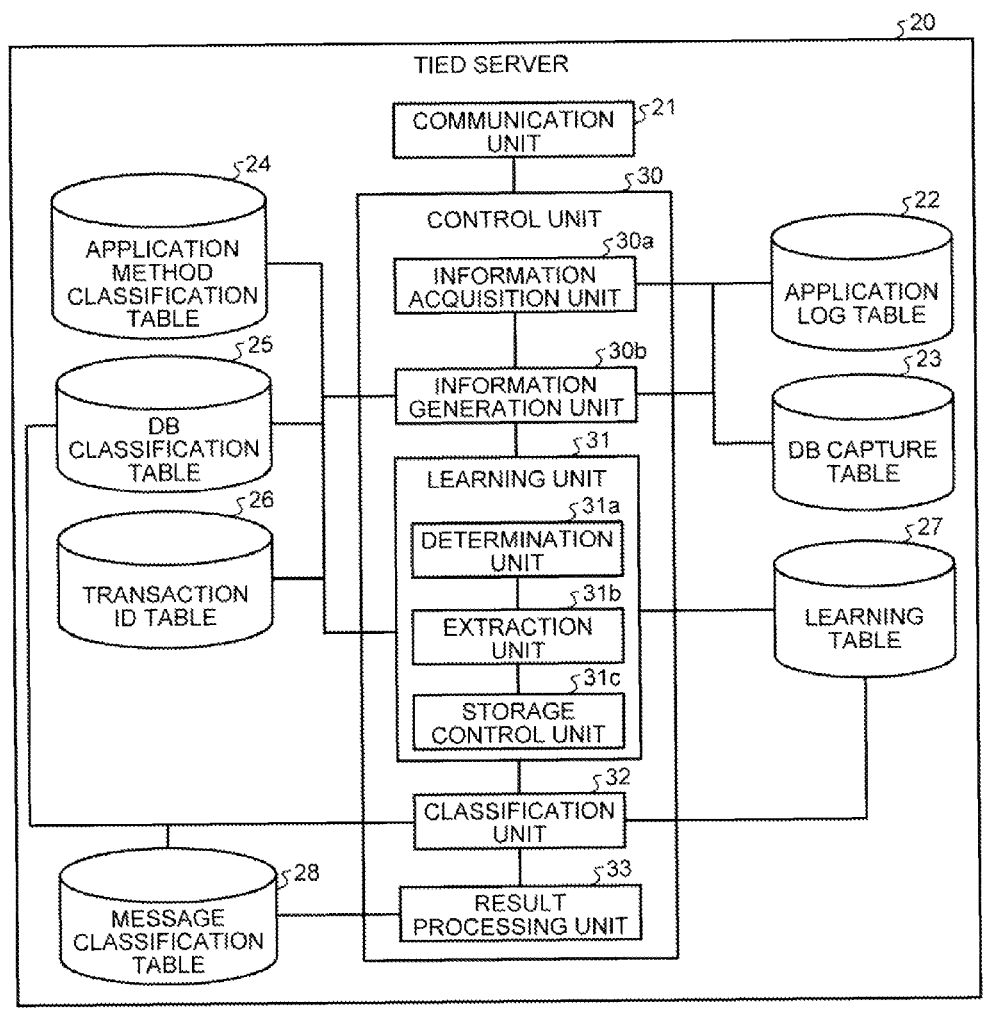
FIG. 6 is a block diagram illustrating the configuration of a tied server according to the second embodiment.

FIG. 6 is a block diagram illustrating the configuration of a tied server according to the second embodiment. As illustrated in FIG. 6, a tied server 20 includes a communication unit 21, an application log table 22, a DB capture table 23, an application method classification table 24, and a DB classification table 25. Further, the tied server 20 includes a transaction ID table 26, a learning table 27, a message classification table 28, and a control unit 30. Each table is provided in a storage apparatus, for example, a semiconductor memory element or a hard disk. Information stored in each table is not limited to information illustrated and can optionally be set and changed.

The communication unit 21 is an interface to control communication with other apparatuses. For example, the communication unit 21 receives log messages from each of the Web server 1, the application server 2, and the DB server 3 via the switch 4.

The application log table 22 stores log messages output by the application server 2. Information acquired by an information acquisition unit 30a described later from the application server 2 is stored in the application log table 22. FIG. 7 is a diagram illustrating an example of information stored in the application log table. As illustrated in FIG. 7, the application log table 22 associates and stores "timestamp, App-key, start/end, TranID, class name, method name, next message, and previous message".

The "timestamp" stored here is a time when a log message is output and the "App-key" is an identifier that identifies the log message assigned by an application server. The "start/end" indicates whether the log message is the start or end of a transaction and the "TranID" indicates a transaction ID added to the log message. The "class name" indicates the name of the class that outputs the log message and the "method name" indicates the name of the method that outputs the log message. The "next message" is the App-key of the log message output next and the "previous message" is the App-key of the log message output previously.

In the case of FIG. 7, a log message output at "12:33:02" is assigned "App-key=123". The log message has "tid-123" and indicates the "start" of a transaction and that the message is output by the "createQuery" method of the "org.hibernate.foo" class. Also, it is indicated that the log message output subsequent to this log message is "124".

Similarly, a log message output at "12:37:04" is assigned "App-key=124". The log message has "tid-123" and indicates the "end" of a transaction and that the message is output by the "createQuery" method of the "org.hibernate.foo" class. Also, it is indicated that the log message output prior to this log message is "123" and the log message output subsequent to this log message is "125".

The DB capture table 23 stores capture messages transmitted/received between the application server 2 and the DB server 3. Information generated by capturing packets and the like in a network by the information acquisition unit 30a described later is stored in the DB capture table 23. FIG. 8 is a diagram illustrating an example of information stored in the DB capture table. As illustrated in FIG. 8, the DB capture table 23 associates and stores "timestamp, DB-key, connection key, fromIP, fromPort, toIP, toPort, sqlmsg, TranID, next message, and previous message".

The "timestamp" stored here is a time when a capture message is output and the "DB-key" is an identifier that identifies the capture message and is uniquely assigned by, for example, the DB server 3. The "connection key" is an identifier uniquely generated from a set of an IP (Internet Protocol) address and a port and is generated by, for example, the DB server 3. The "fromIP" is an IP address of an issuing source server of the capture message of servers connected by a connection through which a transaction is executed. The "fromPort" is a port number of the issuing source server of the capture message of servers connected by the connection through which the transaction is executed. The "toIP" is an IP address of an issuing destination server of the capture message of servers connected by the connection through which the transaction is executed. The "toPort" is a port number of the issuing destination server of the capture message of servers connected by the connection through which the transaction is executed.

The "sqlmsg" indicates, if the capture message contains a SQL instruction, content of the SQL instruction and the "TranID" indicates, if the capture message contains a TranID, the TranID. The "next message" is the DB-key of the capture message transmitted/received next and the "previous message" is the DB-key of the capture message transmitted/received previously.

In the case of FIG. 8, a capture message captured at "12:33:03" is a message issued from a port "59000" with an IP address "A" to a port "3306" with an IP address "B" and having a SQL statement "Select . . . ". The capture message has the TranID "tid-123", the DB-key "132", and the connection key "38" added thereto. The capture message output prior to this capture message is "131" and the capture message output subsequent to this capture message is "133".

The application method classification table 24 stores information associating log messages stored in the application log table 22 with each TranID. Information generated by an information generation unit 30b described later is stored in the application method classification table 24. FIG. 9 is a diagram illustrating an example of information stored in the application method classification table. As illustrated in FIG. 9, the application method classification table 24 associates and stores "key, TranID, last update time, start message, end message, next time-ordered record, previous time-ordered record".

The "key" stored here is an identifier generated for each TranID, that is, an identifier that identifies each record and is generated by, for example, the information generation unit 30b described later. The "TranID" indicates a transaction ID that identifies the transaction. The "last update time" is the latest timestamp value among log messages having the TranID. The "start message" is an APP-key of the start log message with the earliest timestamp value among log messages having the TranID. The "end message" is an APP-key of the end log message with the latest timestamp value among log messages having the TranID. The "next time-ordered record" indicates the key of record of a TranID subsequent to the TranID and the "previous time-ordered record" indicates the key of record of a TranID prior to the applicable TranID.

The first line in FIG. 9 illustrates a log message group having the TranID "tid-123" and the log message group is assigned a key "15". The start log message of the log message group is a message of App-key "123" and the end log message of the log message group is a message of App-key "127" issued at "12:34:05". That is, the log message group contains log messages of App-keys "123" to "127". Also, the first line indicates that the record prior to this record is a record with an assigned key "14" and the next record is a record with an assigned key "18".

The DB classification table 25 is information associating capture messages stored in the DB capture table 23 with each connection key. Information generated by the information generation unit 30b described later is stored in the DB classification table 25. FIG. 10 is a diagram illustrating an example of information stored in the DB classification table. As illustrated in FIG. 10, the DB classification table 25 associates and stores "connection key, last update time, start message, end message, start TranID information, end TranID information".

The "connection key" stored here is an identifier uniquely generated from a set of an IP address and a port and identifies the record. The "last update time" is the latest timestamp value among capture messages having the connection key. The "start message" is a DB-key of the start capture message with the earliest timestamp value among capture messages having the connection key. The "end message" is a DB-key of the end capture message with the latest timestamp value among capture messages having the connection key. The "start TranID information" is an identifier that identifies the record of the TranID appearing first in capture messages having the connection key and is an identifier used in the transaction ID table 26. The "end TranID information" is an identifier that identifies the record of the TranID appearing last in capture messages having the connection key and is an identifier used in the transaction ID table 26.

The first line in FIG. 10 illustrates a capture message group having the connection key "38" and the capture message group contains capture messages whose DB-key ranges from "132" to "144" issued at "12:34:06". In the capture message group, the TranID to which TranID information "512" is given appears first and the TranID to which TranID information "517" is given appears last.

The transaction ID table 26 is information generated by the information generation unit 30b or the like and stores information about TranID. FIG. 11 is a diagram illustrating an example of information stored in the transaction ID table. As illustrated in FIG. 11, the transaction ID table 26 associates and stores "TranID information, TranID, message, next TranID information, DB classification table information".

The "TranID information" stored here is an identifier assigned to a TranID, an identifier that identifies the record and is generated by, for example, the information generation unit 30b. The "TranID" is the above transaction identifier. The "message" is a DB-key of a capture message holding the TranID. The "next TranID information" is reference information to the next TranID information in the same connection. The "DB classification table information" is reference information to a connection holding the record and a connection key is stored therein.

In the case of FIG. 11, TranID "512" is given to the record in the first line. The record indicates that the capture message whose DB-key is "133" among capture messages in the connection key "38" holds the TranID "tid-123". It is also indicated that the TranID of a record with TranID information "513" appears subsequent to the record.

The learning table 27 is information learned by a learning unit 31 described later and stores appearance patterns of messages having the TranID identifying the transaction. FIG. 12 is a diagram illustrating an example of information stored in the learning table. As illustrated in FIG. 12, the learning table 27 associates and stores "type, number of previous messages, number of all messages, reliability".

The "type" stored here is the type of a learned transaction. The "number of previous messages" indicates the number of capture messages output prior to the capture message having the TranID. The "number of all messages" indicates the total number of capture messages output in the learned transaction. The "reliability" indicates reliability of learned information and is represented, for example, on a scale of 1 to 5 with 5 rated highest.

FIG. 12 illustrates that a total of "4" capture messages is output in a transaction related to "Create" that creates a table or the like in a database and the "2"nd of these capture messages appears as a capture message with a TranID. It is also indicated that the reliability of the learning information is "5".

The message classification table 28 stores results of classification of capture messages stored in the DB classification table 25 by transaction using learning information of the learning table 27. Information generated by a classification unit 32 described later is stored in the message classification table 28. FIG. 13 is a diagram illustrating an example of information stored in the message classification table 28. As illustrated in FIG. 13, the message classification table 28 associates and stores "TranID, type, connection key, number of messages, start message, end message, processing time, result".

The "TranID" stored here is a transaction identifier, the "type" indicates the type of a transaction, and the "connection key" is a connection key of the DB classification table 25. The "number of messages" is the number of messages classified as messages output by the same transaction. The "start message" indicates the DB-key of the start capture message among classified capture messages and the "end message" indicates the DB-key of the end capture message among classified capture messages. The "processing time" indicates a DB access time of the transaction and is a time from the first message to the end of the end message. The "result" has "normal" stored therein if messages have been successfully classified and "abnormal" stored therein if messages have not been successfully classified.

In the case of FIG. 13, the transaction "tid-123" to implement "Create" executed by using the connection key "38" has "four" capture messages appearing as the capture message of DB-key "132" to the capture message of DB-key "134". Also, the processing time thereof is indicated to be "2 s". It is also shown that the message classification of this "tid-123" ends "normally" and the transaction executed by the application server 2 and messages of the DB server 3 are associated.

The control unit 30 is a processing unit that learns appearance patterns of messages or implements classification of capture messages and is, for example, an electronic circuit such as a CPU (Central Processing Unit) or an integrated circuit such as an ASIC (Application Specific Integrated Circuit). The control unit 30 includes the information acquisition unit 30a, the information generation unit 30b, the learning unit 31, the classification unit 32, and a result processing unit 33.

The information acquisition unit 30a acquires log message information of each server at predetermined intervals. For example, the information acquisition unit 30a acquires log messages held by the application server 2 at preset intervals such as once in 60 seconds and stores the acquired log messages in the application log table 22. Moreover, data can be acquired in real time by using socket communication or the like.

The information acquisition unit 30a also captures packets in a network. For example, the information acquisition unit 30a captures packets exchanged between the application server 2 and the DB server 3 and stores the captured packets in the DB capture table 23. Various methods that are publicly known can be used for capturing and thus, a detailed description thereof is omitted. When storing capture data in the DB capture table 23, the information acquisition unit 30a may acquire log messages from the DB server 3 to store the acquired log messages in the DB capture table 23, in addition to capture data.

The information generation unit 30b generates various kinds of information from information stored in the application log table 22 or the DB capture table 23 and stores the generated information in the application method classification table 24, the DB classification table 25, or the transaction ID table 26.

First, a creation example of the application method classification table 24 implemented by the information generation unit 30b will be described. For example, the information generation unit 30b selects one "TranID" which is the earliest time from "TranIDs" stored in the application log table 22 and extracts log messages having the selected "TranID". Subsequently, the information generation unit 30b assigns a "key" to the selected "TranID" and generates a record storing information having a set of the "key" and "TranID" in the application method classification table 24. Then, the information generation unit 30b rearranges the log messages according to the "timestamp" of the extracted log messages.

Subsequently, the information generation unit 30b stores the "App-key" of the log message with the earliest "timestamp" among the extracted log messages in the "start message" of the generated record. Similarly, the information generation unit 30b determines and writes the "App-key" of the log message with the latest "timestamp" among the extracted log messages into the "end message" of the generated record. Further, the information generation unit 30b stores the value of the latest "timestamp" in the "last update time" of the application method classification table 24. In this manner, the information generation unit 30b classifies log messages stored in the application log table 22 by "TranID" and stores classification results in the application method classification table 24. The information generation unit 30b also determines the time order of records from each record generated in the application method classification table 24 and the "timestamp" of the application log table 22 and stores the "keys" in the "next time-ordered record" and the "previous time-ordered record".

To cite an example, the information generation unit 30b determines the TranID "tid-123" from the application log table 22 and extracts log messages whose App-key ranges from "123" to "127" as log messages holding "tid-123". Then, the information generation unit 30b generates a key "15" for "tid-123" and generates a record A having "tid-123" and "15" in the application method classification table 24. Then, the information generation unit 30b compares the "timestamp" of each of the log messages whose App-key ranges from "123" to "127" to determine that the App-key of the start log message is "123" and the App-key of the end log message is "127". Then, the information generation unit 30b stores the determined start App-key "123" in the "start message" of the record A and the determined end App-key "127" in the "end message" of the record A. By performing processing as described above, the information generation unit 30b classifies messages held in the application log table 22 by TranID. After the classification, the information generation unit 30b stores the key "18" as the "next time-ordered record" of each TranID "tid-123" and the key "14" as the "previous time-ordered record".

Next, a creation example of the DB classification table 25 implemented by the information generation unit 30b will be described. For example, the information generation unit 30b selects one "connection key" at the earliest time of "connection keys" stored in the DB capture table 23 and extracts capture messages having the selected "connection key". Then, the information generation unit 30b generates a record storing information having the selected "connection key" in the DB classification table 25. Then, the information generation unit 30b rearranges capture messages according to the "timestamp" of the extracted capture messages.

Subsequently, the information generation unit 30b stores the "DB-key" of the capture message with the earliest "timestamp" among the extracted capture messages in the "start message" of the generated record. Similarly, the information generation unit 30b determines and writes the "DB-key" of the capture message with the latest "timestamp" among the extracted capture messages into the "end message" of the generated record. Further, the information generation unit 30b stores the value of the latest "timestamp" in the "last update time" of the record of the DB classification table 25. In this manner, the information generation unit 30b classifies capture messages stored in the DB capture table 23 by "connection key" and stores classification results in the DB classification table 25. The information generation unit 30b also references the transaction ID table 26 to determine the start "TranID information" and the end "TranID information" appearing between the "start message" and the "end message". Then, the information generation unit 30b stores start "TranID information" and the end "TranID information" determined above in the "start TranID information" and the "end TranID information" of the DB classification table 25, respectively.

To cite an example, the information generation unit 30b determines the connection key "38" from the DB capture table 23 and extracts capture messages whose DB-key ranges from "132" to "144" as capture messages holding the connection key "38". Then, the information generation unit 30b generates a record D for the connection key "38" in the DB classification table 25. Subsequently, the information generation unit 30b compares the "timestamp" of each of the capture messages whose DB-key ranges from "132" to "144" to determine that the DB-key of the start capture message is "132" and the DB-key of the end capture message is "144". Then, the information generation unit 30b stores the determined start DB-key "132" in the "start message" of the record D and the determined end DB-key "144" in the "end message" of the record D. By performing processing as described above, the information generation unit 30b classifies messages held in the DB capture table 23 by connection key. After the classification, the information generation unit 30b references the transaction ID table 26 to store "512" in the "TranID information" of the TranID appearing first in a log message group of the connection key "38" and "517" in the "TranID information" of the TranID appearing last.

Next, a creation example of the transaction ID table 26 implemented by the information generation unit 30b will be described. For example, the information generation unit 30b determines the "DB-key" of a capture message holding the "TranID" from the DB capture table 23. Subsequently, the information generation unit 30b determines the "timestamp" of the capture message having the determined "DB-key" and also determines the "connection key" having the "DB-key". Then, the information generation unit 30b generates the "TranID information" for the "TranID", the "DB-key", and the "connection key" determined above and generates a record associating the "TranID information" for the "TranID", the "DB-key", and the "connection key" and the "TranID information" in the transaction ID table 26. The information generation unit 30b also stores the "next TranID information" by determining the time order based on the "timestamp" of log messages having the determined "DB-key".

To cite an example, the information generation unit 30b determines a capture message of the DB-key "133" holding "tid-123" from the DB capture table 23. Then, the information generation unit 30b determines the connection key "38" from the DB classification table 25 using the DB-key "133" of the message as a key. Subsequently, the information generation unit 30b attaches the TranID information "512" to "tid-123", the DB-key "133", and the connection key "38" and generates a record associating the TranID information "512", "tid-123", the DB-key "133", and the connection key "38" in the transaction ID table 26. Then, after a record is generated in the transaction ID table 26, the information generation unit 30b rearranges records having the same "DB classification table information" by time order to determine and store the "next TranID information".

Returning to FIG. 6, the learning unit 31 includes a determination unit 31a, an extraction unit 31b, and a storage control unit 31c and learns the appearance position of messages having a TranID from these units. The determination unit 31a determines the start time, which is a time when the application server 10 issues a request to the DB server, and the end time, which is a time when a response to the request is received, from log messages stored in the application log table 22.

For example, the determination unit 31a selects one record from the application method classification table 24 and determines the "App-key" of the start message and the "App-key" of the end message of the record. Then, the determination unit 31a references the application log table 22 to determine a method indicating a table operation such as "Create . . . ", "Update . . . " and "Delete . . . " from among log messages between the start message and the end message determined above. Then, the determination unit 31a outputs the "timestamp" of the log message indicating the "start" of the determined method as the start time and the "timestamp" of the log message indicating the "end" of the determined method as the end time to the extraction unit 31b. The determination unit 31a also outputs the "TranID" held by a record selected from the application method classification table 24 or the like to the extraction unit 31b.

To describe as an example by using FIGS. 7 to 9, the determination unit 31a determines from the information indicated in FIG. 9 that the start message of the TranID "tid-123" is the App-key "123" and the end message is the App-key "127". Subsequently, the determination unit 31a references the application log table 22 to determine that the App-key of the "start" message of "createQuery" of log messages whose App-key ranges from "123" to "127" is "123" and the App-key of the "end" message is "124". Subsequently, the determination unit 31a outputs the "timestamp" of the log message whose App-key is "123" as the start time and the "timestamp" of the log message whose App-key is "124" as the end time to the extraction unit 31b and also outputs "tid-123" to the extraction unit 31b.

The extraction unit 31b extracts capture messages transmitted/received between the start time and the end time determined by the determination unit 31a from capture messages stored in the DB classification table 25. For example, the extraction unit 31b searches the transaction ID table 26 using the "TranID" determined by the determination unit 31a as a search key to determine the "connection key" associated with the "TranID". Subsequently, the extraction unit 31b determines capture messages output with the determined "connection key" from the DB classification table 25 and extracts capture messages appearing between the start time and the end time from the determined capture messages.

To describe by using the above example, the extraction unit 31b determines the connection key "38" associated with "tid-123" from Information illustrated in FIG. 11. Subsequently, the extraction unit 31b determines the start message "132" to the end message "144" associated with the connection key "38" and the "timestamp" of each of the determined messages "132" to "144" from the DB capture table 23 illustrated in FIG. 8. Among these capture messages, the extraction unit 31b extracts capture messages of "132" to "135" that are between the start time and the end time notified from the determination unit 31a.

The storage control unit 31c determines an appearance pattern of capture messages having the TranID among capture messages extracted by the extraction unit 31b and stores the appearance pattern in the learning table 27. For example, the storage control unit 31c decides the total number of capture messages extracted by the extraction unit 31b as the "number of all messages". The storage control unit 31c determines the "DB-key" of the capture message holding the "TranID" notified from the determination unit 31a from the transaction ID table 26. Then, the storage control unit 31c determines the position of appearance of the capture message holding the "TranID" in capture messages extracted by the extraction unit 31b. Then, the storage control unit 31c stores the type of the method determined by the determination unit 31a in the learning table 27 by associating with the "TranID", the number of previous messages, and the number of all messages. At this point, for example, the storage control unit 31c determines reliability depending on whether the learning number of the type of the method is equal to or more than a predetermined number or learning is carried out in a state in which only one TranID is present in the connection and stores the reliability.

To describe by using the above example, the storage control unit 31c designates "4" ranging from "132" to "135" extracted by the extraction unit 31b as the "number of all messages". The storage control unit 31c also determines the DB-key "133" of the capture message holding "tid-123" from the DB capture table 23 illustrated in FIG. 8 or the transaction ID table 26 illustrated in FIG. 11. Then, the storage control unit 31c detects that "133" is the second in the extracted DB-keys "132" to "135". The storage control unit 31c also designates "Create" of "createQuery" determined by the determination unit 31a as the "type". Subsequently, the storage control unit 31c associates the "number of all messages"="4", the "number of previous messages"="1", and the "type"="Create" and stores them in the learning table 27. Incidentally, because the multiplicity in the connection is 1, the storage control unit 31c may set the "reliability"="5".

Returning to FIG. 6, the classification unit 32 classifies messages stored in the DB classification table 25 by transaction based on appearance patterns of messages stored in the learning table 27. To describe by taking each of above figures as an example, the classification unit 32 selects the record of the connection key "38" from the DB classification table 25 illustrated in FIG. 10 to determine that the DB-keys of messages generated in the connection are "132" to "144".

Subsequently, the classification unit 32 searches the transaction ID table 26 illustrated in FIG. 11 using the connection key "38" as a search key to determine that the TranID "tid-123" appears in connection with the DB-key "133". The classification unit 32 also determines that the method name corresponding to the TranID "tid-123" is "CreateQuery", from the application log table 22 illustrated in FIG. 7. As a result, the classification unit 32 determines the type of the TranID "tid-123" as "Create".

Subsequently, the classification unit 32 searches the learning table 27 illustrated in FIG. 12 using "Create" as a search key to determine that the number of all messages is "4" and the number of previous messages is "1". That is, the classification unit 32 determines that a message having the TranID appears as the second. In this case, if there is a plurality of pieces of information corresponding to "Create", the classification unit 32 may use information with the highest reliability.

Then, because the message of DB-key "133" is the second in messages appearing with the connection key "38" in the DB classification table 25, the classification unit 32 determines that "132" to "134" with reference to the DB-key "133" are messages realized by the TranID "tid-123". Subsequently, the classification unit 32 associates the above TranID "tid-123", the connection key "38", the number of actually detected messages="4", the DB-key "132" of the start message, and the DB-key "134" of the end message and stores them in the message classification table 28. The classification unit 32 also determines the processing time between the DB-keys "132" and "134" from the "timestamp" of the DB capture table 23 illustrated in FIG. 8 and stores the processing time in the message classification table 28.

It is assumed that when the DB-key "133" among messages appearing in the connection key "38" in the DB classification table 25 is used as a reference, only two messages "132" and "133" are present. In this case, the classification unit 32 stores "abnormal" in the "result" because only "2" messages could be detected despite the fact that the number of all messages of learned data is "4". If the state is not such an abnormal state, the classification unit 32 stores "normal" in the "result". If abnormal is stored, the classification unit 32 may decrease the reliability of the learning table.

Returning to FIG. 6, the result processing unit 33 reports the warning or the like in accordance with message classification results. For example, the result processing unit 33 references the message classification table 28 and, if "abnormal" is stored in the "result" field, determines that message classification results are abnormal. Then, the result processing unit 33 displays the TranID associated with "abnormal" in the display or notifies the customer engineer (CE) thereof by mail. The result processing unit 33 references the message classification table 28 to determine that the TranID whose processing time is equal to or more than a predetermined value is also a transaction in which abnormal conditions occurred and performs notification processing.

Concrete Example

Figure 14:
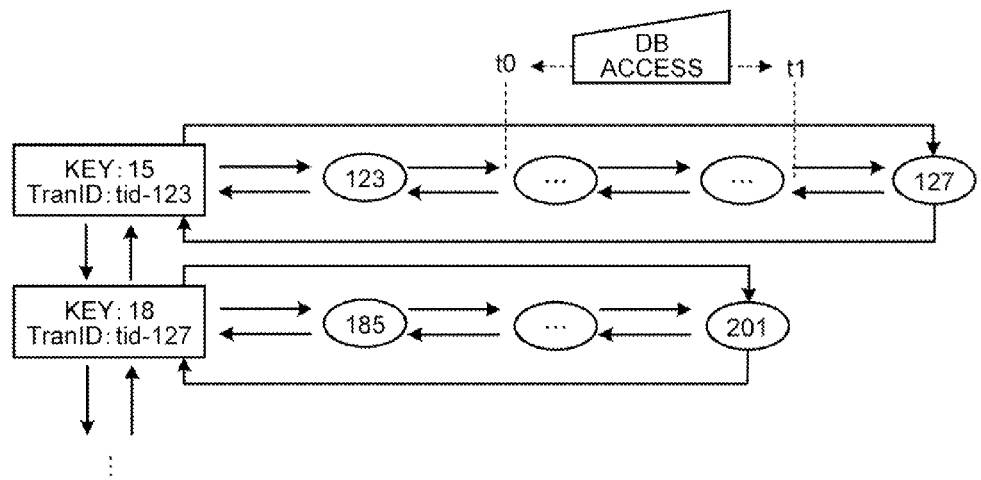
FIG. 14 is a diagram illustrating a relation example of log messages represented by the application method classification table.

Next, a learning example of message appearance patterns and a message classification example will be described using FIGS. 14 and 15. FIG. 14 is a diagram illustrating a relation example of log messages represented by the application method classification table and FIG. 15 is a diagram illustrating a relation example of capture messages represented by the DB classification table.

The determination unit 31a of the learning unit 31 determines the relationship of log messages generated in the application server 10 as illustrated in FIG. 14 by referencing the application method classification table 24. More specifically, as illustrated in FIG. 14, the determination unit 31a determines that a log message group holding the TranID "tid-123" to which the key "15" is given is formed from log messages of the App-key "123" to those of the App-key "127". Similarly, the determination unit 31a also determines that a log message group holding the TranID "tid-127" to which the key "18" is given is formed as a message group subsequent to the TranID "tid-123" from log messages of the App-key "185" to those of the App-key "201".

The determination unit 31a determines the "method name" of each of log messages of the App-key "123" to those of the App-key "127" from the application log table 22. Then, as illustrated in FIG. 14, the determination unit 31a notifies the extraction unit 31b of the "timestamp" of the log message when DB access is done as the start time (t0) and the "timestamp" of the log message when the DB access ends as the end time (t1). Incidentally, the determination unit 31a can determine the method used when the DB access starts and the method used when the DB access ends from the "start/end" field of the application log table 22.

Figure 15:
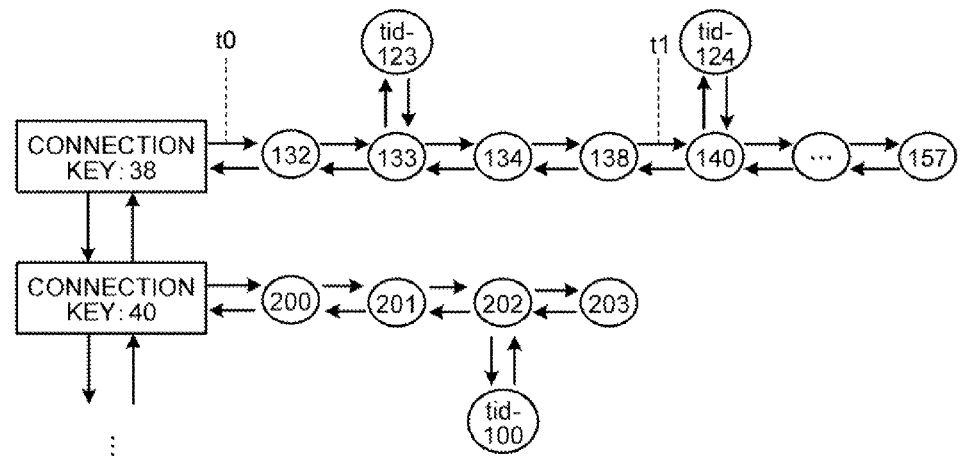
FIG. 15 is a diagram illustrating a relation example of capture messages represented by the DB classification table.

The extraction unit 31b determines the relationship of capture messages communicated between the application server 2 and the DB server 3 as illustrated in FIG. 15. More specifically, as illustrated in FIG. 15, the extraction unit 31b determines that a capture message group occurring in the connection key "38" is formed from messages of the DB-key "132" to those of the DB-key "157". Similarly, the extraction unit 31b determines that a capture message group generated in the connection key "40" is formed from messages of the DB-key "200" to those of the DB-key "203".

The extraction unit 31b determines the "timestamp" of each capture message in the connection key "38" from the DB capture table 23. Then, as illustrated in FIG. 15, the extraction unit 31b extracts messages of the DB-key "132" to those of the DB-key "138" as messages that occur between the start time (t0) and the end time (t1) notified from the determination unit 31a.

The storage control unit 31c references the "TranID" and the "message" of the transaction ID table 26 to determine that the TranID "tid-123" is added to the DB-key "133". Then, as illustrated in FIG. 15, the storage control unit 31c determines that the order of the message to which the TranID "tid-123" is added among messages of the DB-key "132" to those of the DB-key "138" extracted by the extraction unit 31b is the second. The storage control unit 31c also determines the "method name" corresponding to the TranID "tid-123" from the application log table 22 and the "type=create" from the method name of the TranID "tid-123". Then, the storage control unit 31c stores the "type=create", the "number of previous messages=1", and the "number of all messages=4" in the learning table 27. In this manner, the storage control unit 31c can learn appearance patterns of transaction identifiers by transaction "type".

Next, an example of classifying messages using learning results will be described. Here, from the descriptive point of view, the "type" and the "reliability" stored in the learning table are excluded from the description. It is assumed that, for example, the learning table 27 stores "0, 2" as the "number of previous messages, number of all messages" and the transaction ID table 26 stores "tid-100, 202" as the "TranID, message". Capture messages stored in the DB classification table 25 are assumed as illustrated in FIG. 15.

In this case, the classification unit 32 recognizes that a message of the DB-key "202" holding "tid-100" is added to the head of two messages. Thus, as illustrated in FIG. 15, the classification unit 32 cuts out messages of the DB-key "202" and the DB-key "203" from a capture message group generated in the connection key "40" by using the message of the DB-key "202" as a reference. That is, the classification unit 32 determines that DB messages generated in the transaction "tid-100" are messages of the DB-key "202" and the DB-key "203".

Flow of Processing

Next, the flow of processing performed by each apparatus will be described using FIGS. 16 to 18. Here, the flow of processing performed by the application server 10 and the flow of processing performed by the tied server 20 will be described.

Flow of Processing Performed by the Application Server 10)

Figure 16:
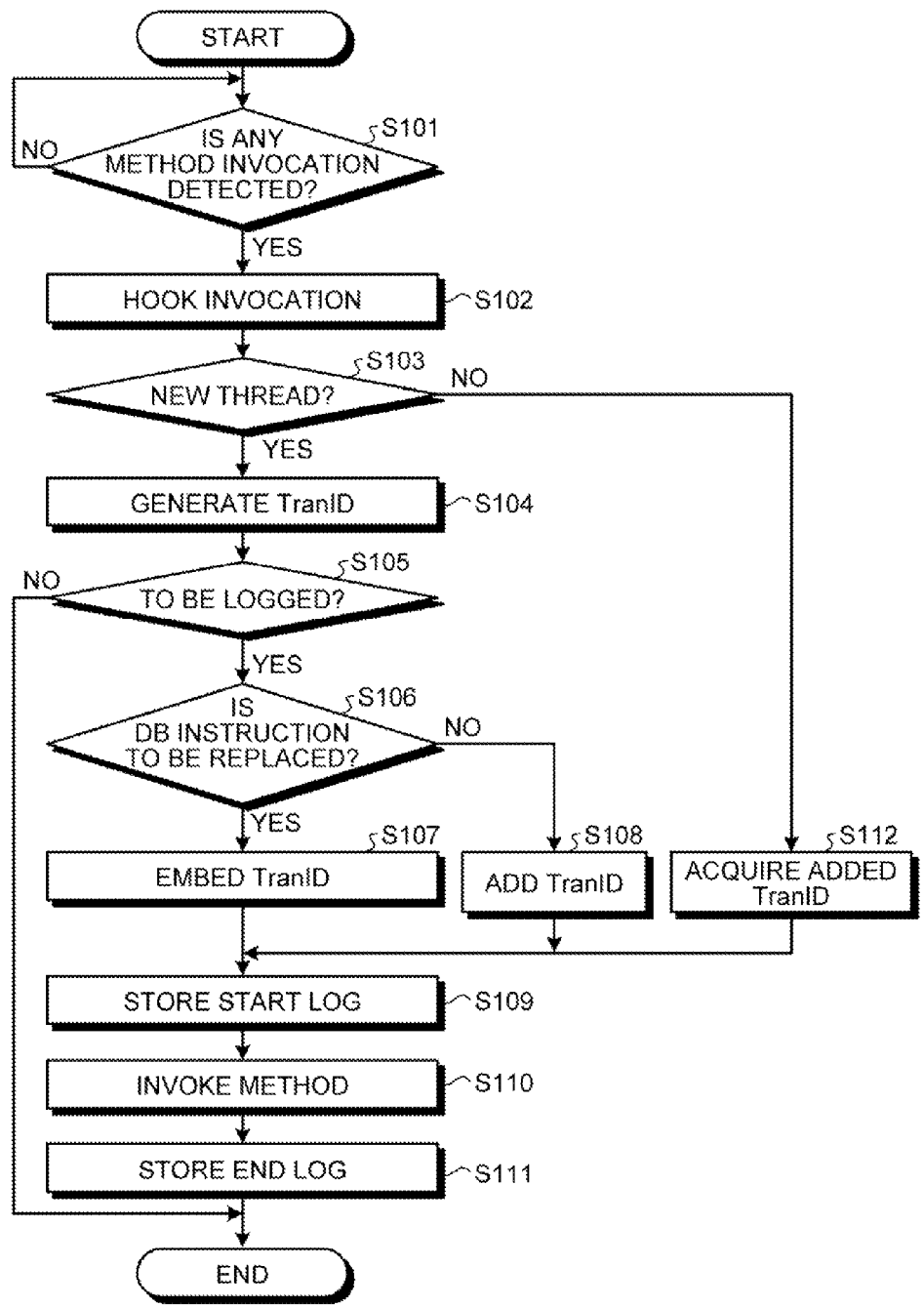
FIG. 16 is a flow chart illustrating a flow of processing performed by an application server.

FIG. 16 is a flow chart illustrating the flow of processing performed by the application server. As illustrating in FIG. 16, when a method invocation of an application by the application execution unit 17a is detected (S101, Yes), the ID generation unit 17b of the application server 10 hooks the invocation (S102). Then, the ID generation unit 17b determines whether the method is a new thread, that is, the method is stored in the ID information table 13 (S103).

Subsequently, if the method is a new thread (S103, Yes), the ID generation unit 17b generates a unique TranID (S104) and references the logging target table 14 to determine whether the method is to be logged (S105).

Then, if the method is to be logged (S105, Yes), the ID addition unit 17c references the DB instruction replacement target table 15 to determine whether the method is to be DB-replaced (S106).

Then, if the method is to be DB-replaced (S106, Yes), the ID addition unit 17c replaces a DB instruction of the method and embeds a TranID in invocation information (S107). On the other hand, if the method is not to be DB-replaced (S106, No), the ID addition unit 17c adds the TranID to the method (S108).

Subsequently, the ID addition unit 17c stores a start log in the log table 16 (S109), invokes and executes a method (S110), and stores an end log in the log table 16 when the method ends (S111).

If, in S103, the method is not a new thread (S103, No), the ID addition unit 17c acquires a TranID already generated for the method from the ID information table 13 and adds the TranID to the method (S112) before performing the processing in S109 and thereafter. If, in S105, it is determined that the method is not to be logged (S105, No), the ID addition unit 17c terminates the processing.

Flow of Processing Performed by the Tied Server 20

Figure 17:
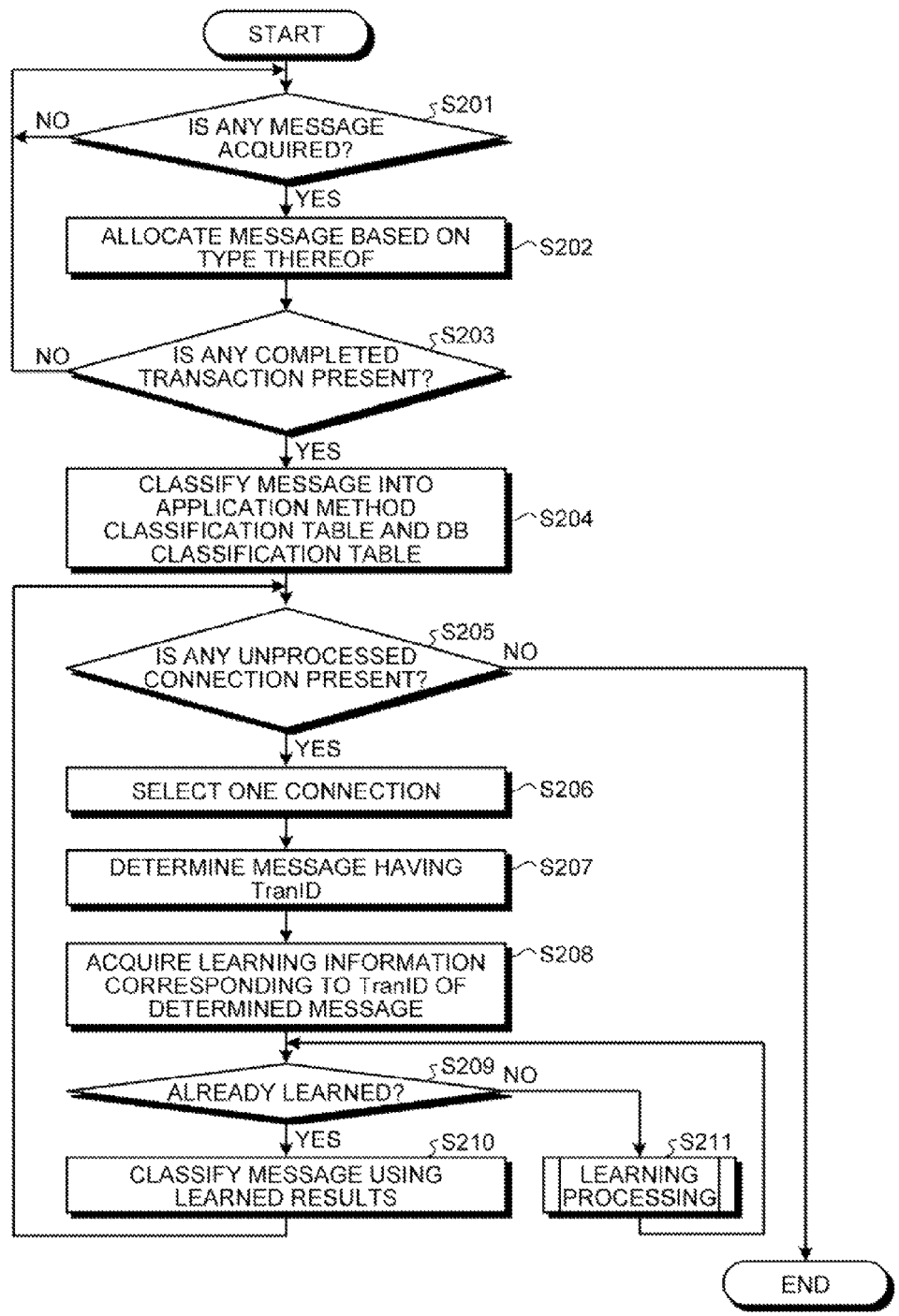
FIG. 17 is a flow chart illustrating the flow of tied processing performed by the tied server.

FIG. 17 is a flow chart illustrating the flow of tied processing performed by the tied server. As illustrated in FIG. 17, when a log message or a capture message is acquired from each server or from inside a network (S201, Yes), the information acquisition unit 30a of the tied server 20 determines the type thereof from the header or the like of the acquired message and allocates the message to each table (S202).

Subsequently, the information generation unit 30b detects the presence of a message indicating completion of a new transaction in the application log table 22 (S203, Yes). Then, the information generation unit 30b generates various kinds of information from information stored in the application log table 22 or the DB capture table 23 to store the generated information in the application method classification table 24, the DB classification table 25, or the transaction ID table 26 (S204).

Then, if the presence of an unprocessed connection in the DB classification table 25 is detected (S205, Yes), the classification unit 32 selects one such connection (S206). Subsequently, the classification unit 32 determines a message having a TranID from the transaction ID table 26 or the like (S207) and acquires learning information corresponding to the TranID of the determined message from the learning table 27 (S208).

Then, if the message appearance pattern of the TranID of the determined message is stored in the learning table 27 and has been learned (S209, Yes), the classification unit 32 classifies messages in the connection selected in S206 by using learned results (S210). Subsequently, the classification unit 32 returns to S205 to perform subsequent processing.

On the other hand, if the message appearance pattern of the TranID of the determined message is not stored in the learning table 27 and has not been learned (S209, No), the classification unit 32 performs learning processing (S211). Then, the classification unit 32 classifies messages in the connection selected in S206 by using learned results after the learning processing (S209 and S210). Subsequently, the classification unit 32 returns to S205 to perform subsequent processing thereafter.

If, in S205, the presence of an unprocessed connection in the DB classification table 25 is not detected (S205, No), the classification unit 32 terminates the processing.

Flow of Learning Processing Performed by the Tied Server 20

Figure 18:
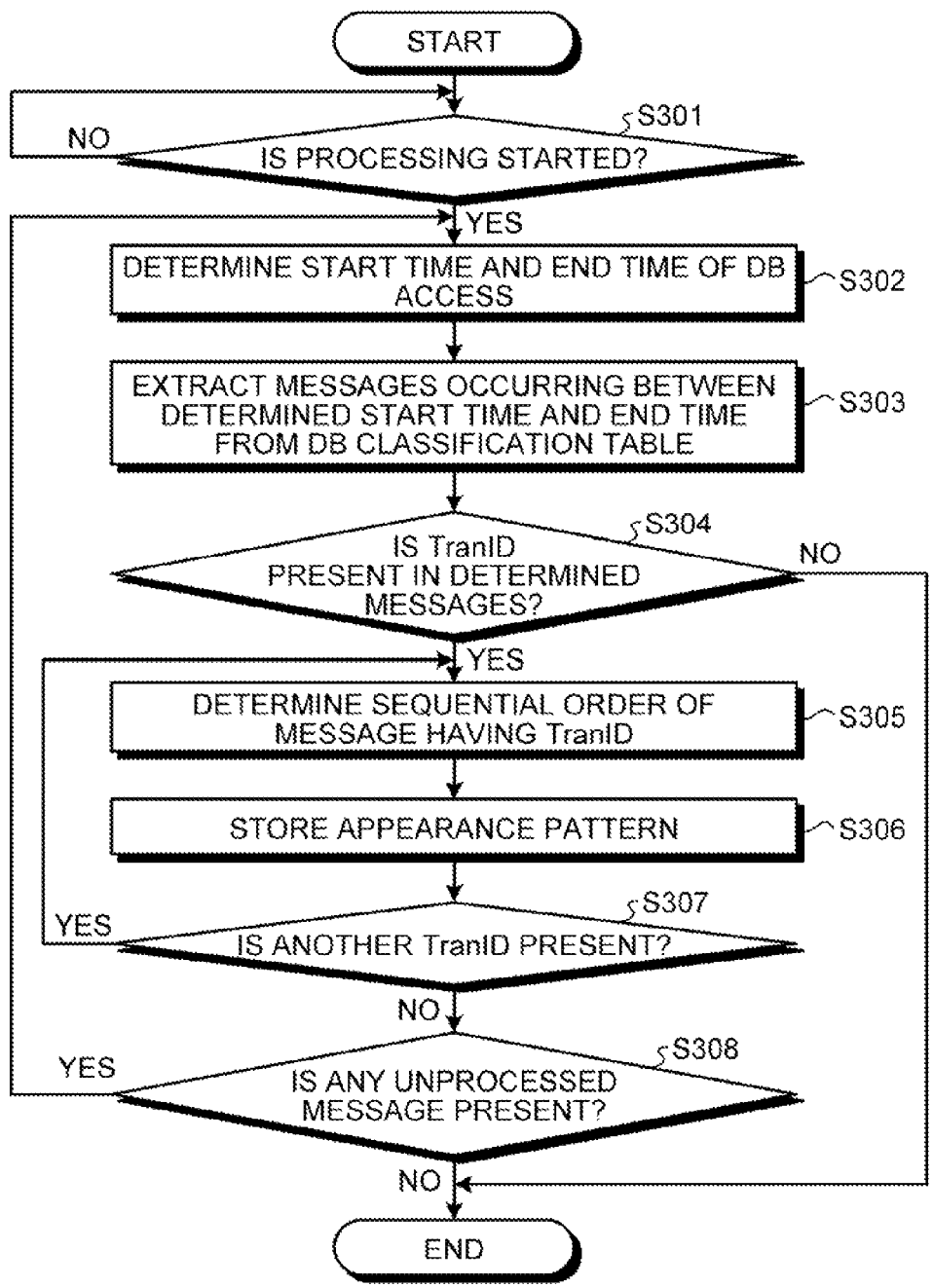
FIG. 18 is a flow chart illustrating the flow of learning processing performed by the tied server.

FIG. 18 is a flow chart illustrating the flow of learning processing performed by the tied server. As illustrated in FIG. 18, when a processing start trigger is reached (S301, Yes), the determination unit 31a of the learning unit 31 references the application log table 22 to determine the start time and the end time of DB access (S302).

Subsequently, the extraction unit 31b determines the determined messages that occur between the start time and the end time from the DB classification table 25 (S303). Then, if a message having a TranID is present in the determined messages (S304, Yes), the storage control unit 31c determines the appearance pattern of the TranID, that is, the position of appearance of the TranID in the determined messages (S305).

Subsequently, the storage control unit 31c stores the appearance pattern of the message holding the TranID in the learning table 27 (S306). At this point, the storage control unit 31c also stores the transaction and type, the number of all messages determined in S305, reliability and the like.

Then, if a message holding another TranID is present (S307, Yes), the storage control unit 31c repeats S305 and S306. If an unprocessed message is present in the application log table 22 (S308, Yes), the storage control unit 31c repeats the processing in S302 and thereafter. If no message holding another TranID is present (S307, No) and no unprocessed message is present in the application log table 22 (S308, No), the storage control unit 31c terminates the processing. If, in S304, it is determined that no message holding a TranID is present (S304, No), the storage control unit 31c terminates the processing.

Effect by the Second Embodiment

The tied server 20 according to the second embodiment can associate all of a series of transactions starting with a processing request to a Web application up to DB access. Accordingly, the process time on a processing path ranging from the application body to external communication can be measured for each transaction and therefore, monitoring of system performance and detection of bottlenecks can efficiently be implemented. Particularly, processes can be implemented by associating communication messages of DB access, which have been difficult to associate.

[c] Third Embodiment

Heretofore, the embodiments of the present invention have been described, but the present invention may be carried out, in addition to the above embodiments, in various different forms. Thus, different embodiments will be described below.

Application Example to a Server

In the above embodiments, examples of associating a transaction executed by an application server and a message communicated between the application server and a DB server have been described, but the present invention is not limited to such examples. For example, the present invention can be applied to a server as well, such as the DB server that, when a transaction is executed by the application server, generates a message, though a portion of the transaction, that is not related to a request or the like.

Reliability

For example, the tied server may learn from capture messages and log messages when one transaction is executed in a connection between an application server and a DB server as a method of increasing reliability of learning results. In this case, compared with a case when a plurality of transactions is executed, the degree of association between the transaction and capture messages is stronger. Thus, the tied server can learn from information having a strong degree of association and thus, reliability of learning results can be increased. The timing of learning may be any timing and learning may be carried out when application log messages are accumulated to equal to or more than a predetermined value.

System

Processing described in the present embodiment as performed automatically may manually be performed wholly or partially. Conversely, all or a portion of processing described as performed manually may automatically be performed by a publicly known method. In addition, processing procedures, control procedures, and concrete names described in the above document or drawings, for example, various kinds of data and information containing parameters illustrated in FIGS. 3 to 5, FIGS. 7 to 13 or the like may arbitrarily be changed if not specifically mentioned.

Each element of each illustrated apparatus is function-conceptual and need not necessarily be configured physically as illustrated. That is, the concrete form of distribution/integration of each apparatus is not limited to the illustrated form. That is, all or a portion thereof may be configured by functional or physical distribution/integration in any unit in accordance with various loads or usage conditions. Further, all or a portion of each processing function executed by each apparatus may be realized by a CPU and a program parsed and executed by the CPU or hardware based on wired logic.

For example, the tied server 20 may have the ID generation unit 17b or the ID addition unit 17c of the application server 10. Alternatively, the application server 10 may have each control unit or each table of the tied server 20.

Program

Incidentally, various kinds of processing described in the above embodiments can be realized by executing a program prepared in advance by a computer system such as a personal computer and workstation. Thus, an example of the computer system executing a program having functions similar to the functions of the above embodiments will be described below.

Figure 19:
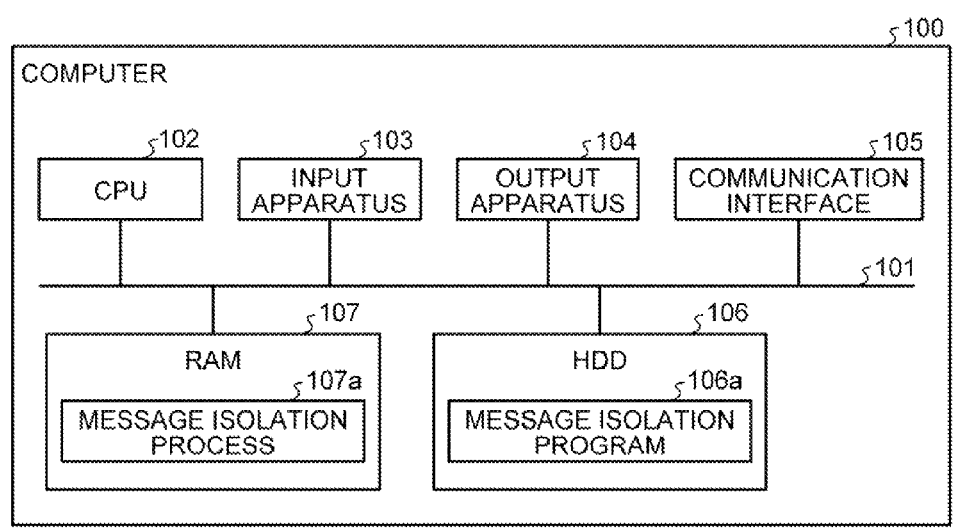
FIG. 19 is a diagram illustrating a hardware configuration example of a computer executing a message isolation program.

FIG. 19 is a diagram illustrating a hardware configuration example of a computer executing a message isolation program. As illustrated in FIG. 19, a CPU 102, an input apparatus 103, an output apparatus 104, a communication interface 105, an HDD (Hard Disk Drive) 106, and a RAM (Random Access Memory) 107 are connected to a bus 101 in a computer system 100.

The input apparatus 103 is a mouse or keyboard, the output apparatus 104 is a display or the like, and the communication interface 105 is an interface such as an NIC (Network Interface Card). The HDD 106 stores, together with a message isolation program 106a, information stored in each table illustrated in FIG. 6 or the like. The HDD 106 is cited as an example of recording media, but various programs may be stored in other computer readable recording media such as a ROM (Read Only Memory), RAM (Random Access Memory), and CD-ROM to cause the computer to read the programs. Recording media may be arranged at remote locations to acquire and use programs after the recording media is accessed by the computer. At this point, the acquired programs may be stored in a recording medium of the computer.

The CPU 102 causes a message isolation process 107a executing each function described in FIG. 6 or the like to operate by reading the message isolation program 106a and expanding the same into the RAM 107. That is, the message isolation process 107a executes functions similar to the functions of the information acquisition unit 30a, the information generation unit 30b, the learning unit 31, the classification unit 32, and the result processing unit 33 illustrated in FIG. 6. Therefore, the computer system 100 operates as an information processing apparatus that executes a message isolation method by reading and executing programs.

A series of transactions can be associated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
 a first storage unit that stores appearance patterns of messages having a transaction identifier to identify a transaction, each of the appearance patterns indicating appearance time order;
 a second storage unit that stores messages communicated between a first server and a second server after the transaction having the transaction identifier being executed on the second server by the first server;
 an extraction unit that extracts the messages transmitted or received between a start time and an end time determined from the messages stored in the second storage unit, the start time being a time when the first server issues a request to the second server, the end time being a time when a response to the request is received;
 a storage control unit that determines the appearance patterns of the messages having the transaction identifier from the messages extracted by the extraction unit and stores the determined appearance patterns in the first storage unit; and
 a classification unit that classifies the messages stored in the second storage unit with respect to each transaction based on the appearance patterns of the messages stored in the first storage unit.

2. The information processing apparatus according to claim 1, further comprising:
 a third storage unit that stores messages generated when the first server executes the transaction with respect to each transaction identifier; and
 a determination unit that determines the start time and the end time from the messages stored in the third storage unit.

3. The information processing apparatus according to claim 2, wherein the extraction unit extracts the start time and the end time from messages when one request is processed in a connection between the first server and the second server among the messages stored in the second storage unit.

4. A messages classifying method comprising:
 storing appearance patterns of messages having a transaction identifier to identify a transaction in a first storage unit, each of the appearance patterns indicating appearance time order;
 storing messages communicated between a first server and a second server after the transaction having the transaction identifier being executed on the second server by the first server in a second storage unit;
 extracting the messages transmitted or received between a start time and an end time determined from the messages stored in the second storage unit, the start time being a time when the first server issues a request to the second server, the end time being a time when a response to the request is received;

determining the appearance patterns of the messages having the transaction identifier from the messages extracted at the extracting;

storing the appearance patterns determined at the determining in the first storage unit; and classifying the messages stored in the second storage unit with respect to each transaction based on the appearance patterns of the messages stored in the first storage unit.

5. A computer-readable, non-transitory medium storing therein a program for classifying messages causing a computer to execute a process comprising:

storing appearance patterns of messages having a transaction identifier to identify a transaction in the first storage unit, each of the appearance patterns indicating appearance time order;

storing messages communicated between a first server and a second server after the transaction having the transaction identifier being executed on the second server by the first server in the second storage unit;

extracting the messages transmitted or received between a start time and an end time determined from the messages stored in the second storage unit, the start time being a time when the first server issues a request to the second server, the end time being a time when a response to the request is received;

determining the appearance patterns of the messages having the transaction identifier from the messages extracted at the extracting;

storing the appearance patterns determined at the determining in the first storage unit; and classifying the messages stored in the second storage unit by transaction based on the appearance patterns of the messages stored in the first storage unit.

6. An information processing apparatus comprising:

a memory; and a processor, wherein the processor executes:

storing appearance patterns of messages having a transaction identifier to identify a transaction in the memory, each of the appearance patterns indicating appearance time order;

storing messages communicated between a first server and a second server after the transaction having the transaction identifier being executed on the second server by the first server in the memory;

extracting the messages transmitted or received between a start time and an end time determined from the messages stored in the memory, the start time being a time when the first server issues a request to the second server, the end time being a time when a response to the request is received;

determining the appearance patterns of the messages having the transaction identifier from the messages extracted at the extracting;

storing the appearance patterns determined at the determining in the memory; and classifying the messages stored in the memory with respect to each transaction based on the appearance patterns of the messages stored in the memory.

* * * * *